Figure 1:
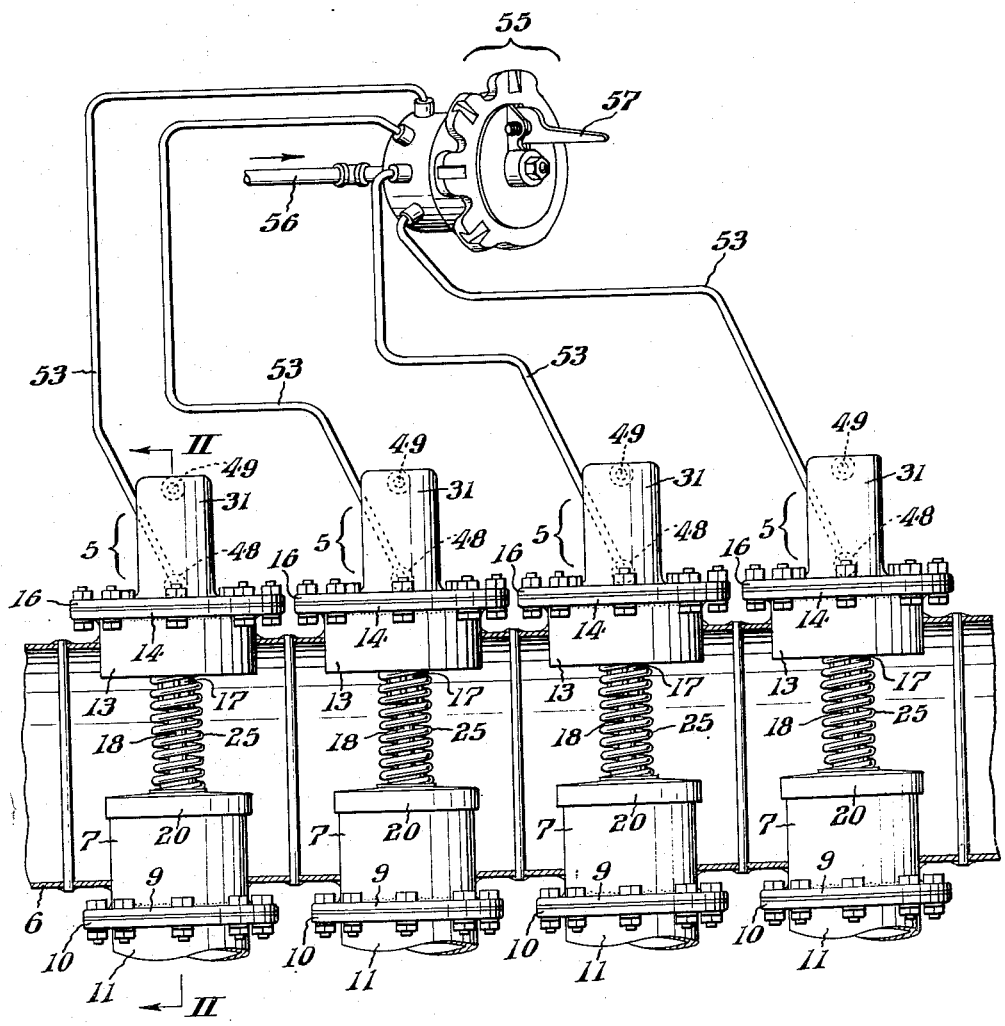

Dec. 7, 1954 J. A. JENSEN 2,696,361
VALVE
Filed April 29, 1953 2 Sheets-Sheet 1

INVENTOR.
James A. Jensen,
BY Paul & Paul
ATTORNEYS

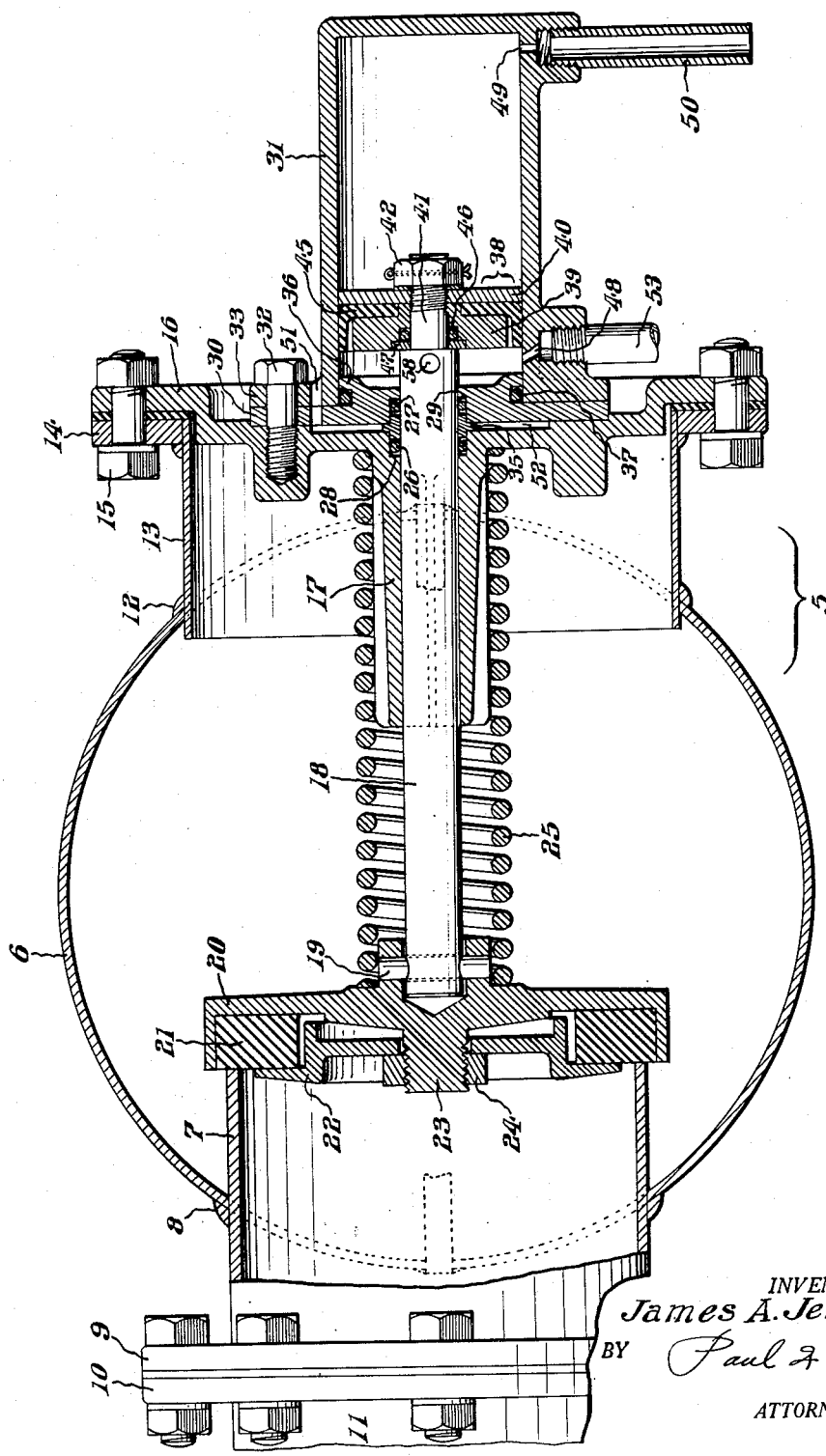

United States Patent Office 2,696,361
Patented Dec. 7, 1954

2,696,361

VALVE

James A. Jensen, Haverford, Pa., assignor to Philadelphia Valve Company, Philadelphia, Pa., a corporation of Pennsylvania Application April 29, 1953, Serial No. 351,888

4 Claims. (Cl. 251—62)

This invention relates to valves. More particularly, it is concerned with valves generally of the type disclosed in U. S. Patent 2,573,263 granted to me on October 30, 1951, for controlling flow from the tanks of motor vehicles such as are ordinarily employed, for example, in the delivery of gasoline, fuel oils and other fluid commodities, through individual outlet pipes leading from separate compartments of the tanks to drain manifolds common to said pipes.

My present invention has for its chief aim, the provision, in connection with valves of the kind referred to, of simple and reliable incorporated power means for actuating the valves selectively under manual control.

Other objects and attendant advantages will appear from the following detailed description of the attached drawings, wherein:

Fig. 1 is a fragmentary view showing a horizontal section axially through a tank draining manifold in which several of my improved valves are interposed, and a manual controlled power means through the medium of which the valves are selectively operable; and Fig. 2 is a transverse sectional view of the manifold axially through one of the valves, the section being taken as indicated by the angled arrows II—II in Fig. 1.

In these illustrations, the improved valves of my invention are comprehensively designated respectively by the numeral 5, and although they may be individually constructed, I have shown them as built into a thin walled wrought manifold 6 in generally the same manner as the valves in my hereinbefore referred to patent. The seat of each valve 5 is provided by a short section of wrought tubing 7 which is fitted into an opening in one side of manifold 6 and which is permanently integrated with the latter by welding as at 8. At its external end, the tube section 7 is provided with a flange 9 which is bolted to a similar flange 10 at the contronting end of a pipe 11 leading from one of the compartments of the vehicle tank, not illustrated. Similarly fitted into a coaxial opening in the other side of manifold 6 and integrated with the latter by welding at 12 is a short wrought tube neck section 13 of somewhat larger diameter than the seat section 7. To a flange 14 at the external end of tube section 13 is secured, by bolts 15, a cover plate 16 having an inwardly-extending bored axial boss 17 in which the slide stem 18 of the valve is guided for endwise movement. Affixed to the inner end of stem 18 by a transverse pin 19 is the closure element 20 of the valve, and recessed into said element is an annular gasket 21 which is adapted to seal against the inner end of the seat section 7. Gasket 21 is preferably formed from non-metallic corrosion-resistant material such as "neoprene" and is backed by a retaining clamp disk 22 which is centrally apertured to engage over a threaded axial projection 23 of closure element 20 and fastened by a nut 24 in threaded engagement with said projection. A helical spring 25, surrounding stem 18 and in compression between cover plate 16 and closure element 20, is relied upon to normally hold the valve closed with gasket 21 in tight sealing contact with the seat afforded by tube section 7. It is to be understood that the spring 25 is of such strength as to keep the valve tightly closed against the weight pressure of the liquid in the corresponding compartment of the tank. Fluid leakage around stem 18 is prevented by a pair of surrounding O section rings 26 and 27 which, like gasket 20, are preferably of neoprene, the former of said gaskets occupying an axial counterbore 28 in cover plate, and the latter occupying a counterbore 29 in the head 30 of a cup section pressure fluid actuating cylinder 31. As shown, cylinder 31 is secured to cover plate 16 by cap bolts 32 whereof the shanks pass through registering holes in the head flange 33 of said cylinder and threadedly engage into said plate. A circumferentially-flanged metallic ring 35 surrounding stem 18 and interposed between cover plate 16 and cylinder head 30, serves as a separator for the sealing rings 26 and 27. An axial projection 36 of cylinder head 30 extends partway into the interior of cylinder 31, and lodged in a circumferential groove thereof is a sealing ring 37 which prevents fluid leakage at that region.

Connected to the outer or distal end of the stem 18 within cylinder 31 is a piston 38. As shown, the piston 38 is formed by two metallic disk components 39 and 40 which are axially apertured to fit over the diametrically reduced terminal end 41 of the stem 18, and which are secured by a nut 42 engaged upon the protruding portion of said end, with the component 39 stopped against the shoulder of said stem. Clamped between disks 39 and 40 is a cup washer 45 which may be fashioned from leather or any suitable non-metallic material, and of which the peripheral flange has a slide seal fit within the bore of cylinder 31. Fluid leakage around the reduced end 41 of the stem 18 is prevented by an O section packing ring 46 confined in a counterbore of the disk 39 by a retaining washer 47. When the valve is to be opened, pressure fluid is admitted into cylinder 31 through a lateral port 48 adjacent the flange 33 to act upon the piston 38 incident to which relief takes place by way of a lateral bleed port 49 adjacent the opposite or outer end of the cylinder, the last mentioned port being protected against entry of dust or dirt by the tube indicated at 50. Compressed air taken from the supply reservoir (not illustrated) for the brake system of the vehicle may be utilized as the pressure medium for actuating the valve. For ready detection of air leakage in the event that the sealing rings 27 and 28 should break down, I have provided a small escape port 51 which communicates with the spacial interval 52 between the cover plate and the cylinder head.

For the purposes of exemplification, the inlet ports 48 of the actuating cylinders of the several valves in Fig. 1 are shown as connected, by individual tubes, 53 to a manually operable master control valve 55 which may be of any well known construction and which is in communication with the supply source of compressed air by way of the pipe indicated at 56. It is to be understood that turning of the operating handle 57 of master valve 55 to the proper selective position, will be attended by opening of the corresponding valve 5 of the group to the exclusion of the others.

The described construction is unique in that, when access to the gasket 21 of any of the valves becomes necessary as a consequence of wear after service over a protracted period, the entire assembly including the cover disk 16, the closure element 20 and the cylinder 31 can be withdrawn as a unit after removal of the bolts 15, the opening through the tube section 13 constituting the neck of the valve being amply large to pass said closure element. Replacements of the ring gaskets 27, 28 and 37 is likewise easily and readily accomplished simply by removing the bolts 32, whereupon cylinder 31 can be withdrawn from over piston 38 and the latter disassembled from stem 18 by removal of the nut 42 for release of cylinder head 33. To facilitate disassembling of the piston 38, the stem 18 is provided with a diametral hole 58 for insertion of an implement such as a tool shank or the like to hold said stem against rotation during removal of nut 42.

Having thus described my invention, I claim:

1. A valve of the character described having a body with an internal seat around the inlet thereof, and a coaxial neck diametrically opposite the inlet; a removable cover plate for the neck; a slide stem extending through a packed axial aperture in the cover plate; a closure element connected to the inner end of the stem; spring means for normally maintaining the closure element engaged with the seat; a piston at the outer end of the stem;

a cup section actuating cylinder, with a peripheral flange at its open end, engaged over the piston, said cylinder having a port by way of which pressure fluid is admitted to one side of the piston for retraction of the closure element from its seat against the resistance of the spring means; a separable head plate interposed between the flange of the cylinder and the cover plate, said head plate having an axial projection extending into the cylinder for a short distance; a packing ring lodged in the circumferential groove in the axial projection of the cylinder and the cover plate; and securing bolts with their shanks passing through registering holes in the cylinder flange and head plate and threadedly engaging into the cover plate.

2. A valve of the character described having a body with an internal seat around the inlet thereof, and a coaxial neck diametrically opposite the inlet; a removable cover plate for the neck; a slide stem extending through a packed axial aperture in the cover plate; a closure element connected to the inner end of the stem; spring means for normally maintaining the closure element engaged with the seat; a piston at the outer end of the stem; a cup section actuating cylinder, with a peripheral flange at its open end, engaged over the piston, said cylinder having a port by way of which pressure fluid is admitted to one side of the piston for retraction of the closure element from its seat against the resistance of the spring means; a separable head plate interposed between the flange of the cylinder and the cover plate, and apertured for passage of the stem through it; headed securing bolts with their shanks extending through registering holes in the cylinder flange and the head plate and threadedly engaging into the cover plate; and packing rings lodged in counterbores in the confronting faces of the cover plate and the cylinder head plate and surrounding the stem.

3. A valve of the character described having a body with an internal seat around the inlet thereof, and a coaxial neck diametrically opposite the inlet; a removable cover plate for the neck; a slide stem extending through a packed axial aperture in the cover plate; a closure element connected to the inner end of the stem; spring means for normally maintaining the closure element engaged with the seat; a piston at the outer end of the stem; a cup section actuating cylinder, with a peripheral flange at its open end, engaged over the piston, said cylinder having a port by way of which pressure fluid is admitted to one side of the piston for retraction of the closure element from the seat against the resistance of the spring means; a separable head plate interposed between the flange of the cylinder and the cover plate, and apertured for passage of the stem through it; headed securing bolts with their shanks extending through registering holes in the cylinder flange and the head plate and threadedly engaging into the cover plate; and packing rings lodged in counterbores in the confronting faces of the cover plate and the cylinder head plate and surrounding the stem, and a metallic spacing annulus with its opposite ends engaging into the counterbores of the cover plate and the cylinder head plate and having a peripheral flange extending into a spacial interval of corresponding width between the cylinder head plate and a depressed surface centrally of said cover plate.

4. A valve according to claim 3, wherein the interval between the cylinder head plate and the depressed surface of the cover plate is in communication with the atmosphere by way of registering holes in the cylinder flange and said head plate.

References Cited in the file of this patent
UNITED STATES PATENTS

| Number | Name | Date |
|---|---|---|
| 742,136 | Tilden | Oct. 20, 1903 |
| 877,043 | Bowers | Jan. 21, 1908 |
| 2,271,833 | Shipman | Feb. 3, 1942 |
| 2,573,263 | Jensen | Oct. 30, 1951 |